United States Patent
Kharas

(10) Patent No.: US 6,235,255 B1
(45) Date of Patent: May 22, 2001

(54) CATALYST SUPPORT HAVING ZEOLITE WITH HIGH SODIUM BACK ION-EXCHANGE CAPACITY AND CATALYSTS MADE THEREFROM

(75) Inventor: Karl C. C. Kharas, Tulsa, OK (US)

(73) Assignee: ASEC Manufacturing, Catoosa, OK (US)

( * ) Notice: Subject to any disclaimer, the term of this patent is extended or adjusted under 35 U.S.C. 154(b) by 0 days.

(21) Appl. No.: 09/316,234

(22) Filed: May 21, 1999

(51) Int. Cl.[7] .................................................. B01J 8/00
(52) U.S. Cl. .................. 423/213.5; 423/212; 423/213.2; 423/239.1; 423/239.2
(58) Field of Search ................. 423/212, 213.2, 423/213.5, 239.1, 239.2

(56) References Cited

U.S. PATENT DOCUMENTS

| | | |
|---|---|---|
| 5,051,244 * | 9/1991 | Dunne et al. ................... 423/212 |
| 5,270,024 | 12/1993 | Kasahara et al. . |
| 5,284,638 | 2/1994 | Hertl et al. . |
| 5,407,651 | 4/1995 | Kawai . |
| 5,409,671 | 4/1995 | Takemoto et al. . |
| 5,433,933 | 7/1995 | Eshita et al. . |
| 5,443,803 | 8/1995 | Mizuno et al. . |
| 5,662,869 | 9/1997 | Abe et al. . |
| 5,772,972 | 7/1998 | Hepburn et al. . |
| 5,814,287 | 9/1998 | Adamczyk, Jr. et al. . |
| 5,968,466 * | 10/1999 | Kharas ............................. 423/239.2 |

* cited by examiner

Primary Examiner—Tom Dunn
(74) Attorney, Agent, or Firm—Kuffner & Associates

(57) ABSTRACT

The present invention relates to catalyst support comprising an inorganic oxide, preferably alumina, and zeolite in the proton form and having a high Si/Al ratio, wherein the zeolite is selected from those protonated zeolites that would exhibit a high Na/Al mole ratio if treated with a solution of sodium nitrate until all sites that will accept a sodium ion have done so. This invention also relates to catalyst that is made from such support, to a method of treating exhaust gas from "lean-burn" engines using catalyst of this invention, and to a method for determining if a zeolite is a suitable support component.

10 Claims, 3 Drawing Sheets ated with Cu and a second layer of zeolite impregnated with Cu and Zr; and U.S. Pat. No. 5,433,933 (Eshita, et al.) teaches a zeolite having a silica/alumina ratio of at least 15 impregnated with Co and optionally an alkaline earth metal or rare earth metal.

CATALYST SUPPORT HAVING ZEOLITE WITH HIGH SODIUM BACK ION-EXCHANGE CAPACITY AND CATALYSTS MADE THEREFROM

FIELD OF THE INVENTION

The present invention relates to catalyst support that, when combined with noble metal to form a catalyst, exhibits superior fresh and aged performance when used to treat exhaust gas from internal combustion engines operating with an amount of air in excess of that required to combust the fuel supplied, i.e., "lean-burn" engines. More particularly, the present invention relates to a catalyst support comprising an inorganic oxide and zeolite in the proton form and having a high Si/Al ratio, wherein the zeolite is selected from those protonated zeolites that would exhibit a high Na/Al mole ratio if treated with a non-basic solution of a sodium salt until all sites that will accept a sodium ion have done so. This invention also relates to catalysts that are made from such support, to a method of treating exhaust gas from "lean-burn" engines using a catalyst of this invention, and to a method for determining if a zeolite is a suitable support component.

BACKGROUND OF THE INVENTION

Much research has been done to develop catalysts that reduce the amounts of CO, hydrocarbons and $NO_x$ emitted to the atmosphere in the exhaust gases of internal combustion engines. More recently, because automobile manufacturers have chosen to produce "lean-burn" engines to improve fuel economy, this research has concentrated on reducing those emissions from internal combustion engines that operate lean. Catalysts that were found to be effective in reducing emissions of CO, hydrocarbons (HC), particulate matter (PM) and $NO_x$ (i.e., "Four-Way Catalysts") emitted from engines operating with a stoichiometric amount of combustion air have, in many cases, been found to be less effective in reducing $NO_x$ in exhaust gases from lean-burn engines, particularly after the catalysts have been used for a period of time, i.e., aged.

A good deal of the most recent research in emissions control catalysts has been focused on the control of hydrocarbon emissions during the period shortly after engine start-up, often referred to as "cold start". For example, U.S. Pat. No. 5,284,638 (Hertl, et al.), U.S. Pat. No. 5,662,869 (Abe, et al.) and U.S. Pat. No. 5,814,287 (Adamczyk, Jr., et al.) teach the use of a hydrocarbon adsorbent along with a conventional three-way catalyst, while U.S. Pat. No. 5,772,972 (Hepburn, et al.) teaches a hydrocarbon adsorbent along with a Pd-based three-way catalyst.

Other researchers of lean-burn catalysts have focused their efforts on various metal systems on conventional supports. For example, U.S. Pat. No. 5,618,505 (Subramanian, et al.) teaches a two-stage catalyst system comprising a first stage of tungsten on γ-alumina and a second stage of γ-alumina with Cu, Co, Fe, or Mn dispersed thereon.

Many patents have been granted on lean-burn catalysts of various metals on zeolite supports also. For example, U.S. Pat. No. 5,270,024 (Kasahara, et al.) teaches a catalyst comprising a zeolite with a silica/alumina ratio of at least 10 with Cu and one rare earth dispersed thereon; U.S. Pat. No. 5,407,651 (Kawai) teaches a catalyst comprising a zeolite, and optionally alumina, having Mn, Co+Pd, or Co+Ag dispersed thereon; U.S. Pat. No. 5,443,803 (Mizuno, et al.) teaches a two-stage catalyst comprising zeolite with Co and an alkaline earth metal and zeolite with Cu; U.S. Pat. No. 5,409,671 (Takemoto, et al.) teaches a two-layer catalyst, the first layer being a Na-type zeolite having a silica/alumina ratio of 30 impregnated with Cu and a second layer of zeolite impregnated with Cu and Zr; and U.S. Pat. No. 5,433,933 (Eshita, et al.) teaches a zeolite having a silica/alumina ratio of at least 15 impregnated with Co and optionally an alkaline earth metal or rare earth metal.

None of these researchers have investigated the character of the zeolite used in their catalysts beyond those few who have specified a minimum silica/alumina ratio. This invention teaches that the performance, both new and when aged, of lean-burn catalysts is improved when particular zeolites are used in the support formulation.

SUMMARY OF THE INVENTION

This invention relates to catalyst support which, when combined with noble metal to form a catalyst, forms a catalyst that is superior in reducing noxious emissions from internal combustion engines. More particularly, this invention relates to catalyst supports comprising an inorganic oxide, preferably alumina, and zeolite in the proton form and having a high Si/Al ratio, wherein the zeolite is selected from those protonated zeolites that would exhibit a high Na/Al mole ratio if treated with a non-basic solution of a sodium salt until all sites that will accept a sodium ion have done so. This invention also relates to catalysts that are made from such supports, to a method of treating exhaust gas from "lean-burn" engines using a catalyst of this invention, and to a method for determining if a zeolite is a suitable support component.

The support of the present invention comprises between about 10 wt. % and about 80 wt. % an inorganic oxide, preferably alumina and most preferably θ-alumina, and the balance zeolite, preferably ZSM-5. Catalyst of this invention comprises such support on which has been dispersed between about 0.0283 $g/m^3$ (1 $g/ft^3$) and about 5.66 $g/m^3$ (200 $g/ft^3$) of noble metal, preferably Pt.

DESCRIPTION OF THE INVENTION

Figure 1:
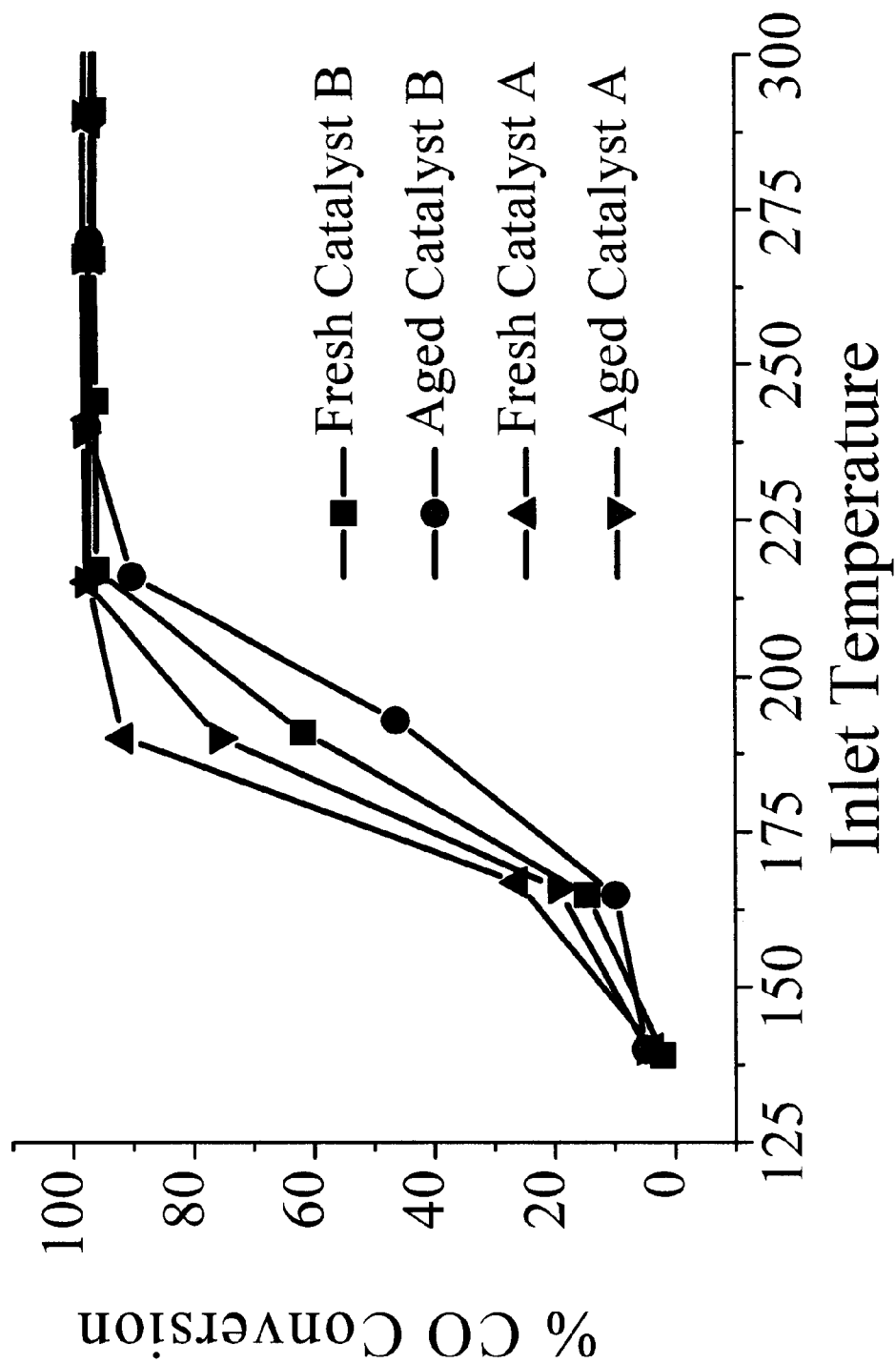
FIG. 1 shows CO conversion versus inlet temperature of exhaust gas when treated by fresh and aged catalyst of this invention compared to that of fresh and aged catalyst of the same nominal composition made from zeolite with low sodium back ion exchange capacity.

This invention relates to catalyst supports comprising an inorganic oxide, preferably alumina, and zeolite in the proton form and having a high Si/Al ratio, wherein the zeolite is selected from those protonated zeolites that would exhibit a high Na/Al mole ratio if treated with a non-basic solution of a sodium salt, such as, but not limited to, sodium nitrate, sodium perchlorate or sodium chloride, until all sites that will accept a sodium ion have done so. This invention also relates to catalysts that are made from such supports, to a method of treating exhaust gas from "lean-burn" engines using a catalyst of this invention, and to a method for determining if a zeolite is a suitable support component.

In attempting to explain why some platinum on alumina/zeolite catalysts performed better than others having nominally the same composition, the inventor discovered that superior catalyst performance could be predicted by the sodium back ion exchange capacity of the zeolite used in the manufacture of the alumina/zeolite support. The use of those zeolites that exhibit sodium back ion exchange capacity of at least 0.75, measured as the mole ratio of Na to Al, produce better catalysts.

Zeolite used in the manufacture of catalyst supports for eventual manufacture of catalysts effective in converting CO, hydrocarbons and $NO_x$ and reducing particulate emissions (i.e., "four-way catalysts") in exhaust gas from a "lean-burn" internal combustion engine is often combined with an inorganic oxide to form the catalyst support. Zeolite in the proton form and having a high Si/Al ratio has been found to produce superior lean-burn four-way catalysts, but some catalysts performed noticeably better, both when fresh and after aging, than others made with nominally the same zeolite. In attempting to discover the difference among these catalysts that accounted for their different performance, the inventor subjected samples of the zeolites that were used to manufacture the catalyst supports to sodium back ion exchange. Sodium back ion exchange involves replacing the $H^+$ or $NH_4^+$ ions in the as-received zeolite with sodium ions. This may be accomplished by suspending a sample of zeolite in a solution of sodium nitrate and stirring for a sufficiently long enough time (preferably at least 10 hours) to insure good contacting, then filtering and washing the zeolite with deionized water to remove occluded sodium nitrate whose sodium does not occur at exchange sites, and analyzing the resultant zeolite by ICP spectroscopy to determine the zeolite's Na/Al mole ratio. This suspending, stirring, filtering, washing and analyzing procedure is repeated until the resulting Na/Al mole ratio is within 5%, and preferably within 3%, on two successive analyses (calculated as the difference between Na/Al mole ratios divided by the lower of the two ratios, the quotient being expressed as a percentage), indicating that equilibrium has been achieved.

The reason why zeolite exhibiting a high Na/Al mole ratio after sodium back ion exchange produces a better four-way catalyst than one exhibiting a low Na/Al mole ratio is not understood. Nor is it understood why some zeolites exhibit a high Na/Al mole ratio and others manufactured by the same party do not. To illustrate that significant variation in the Na/Al mole ratio exists in manufactured zeolites, the following Tables 1–3 show data resulting from analysis of a variety of commercially available zeolites manufactured by several different parties.

TABLE 1

| Manufacturer | Commercial Designation | Si/Al | Na/Al (after Na back ion exchange) |
| --- | --- | --- | --- |
| Tosoh | HSZ830 | 13.47 | 0.910 |
|  | HSZ840 | 19.30 | 0.658 |
|  | HSZ850 | 27.18 | 0.124 |

TABLE 2

| Manufacturer | Commercial Designation | Si/Al | Na/Al (after Na back ion exchange) |
| --- | --- | --- | --- |
| Zeochem | Zeocat PZ-2/25H | 15.74 | 0.53 |
|  | PZ-2/50H | 28.69 | 0.64 |
|  | PZ-2/100H | 50.84 | 0.82 |

TABLE 3

| Manufacturer | Commercial Designation | Si/Al | Na/Al (after Na back ion exchange) |
| --- | --- | --- | --- |
| UOP | MFI-38 | 20.15 | 0.75 |
|  | MFI-38 | 20.37 | 0.38 |
|  | MFI-38 | 20.54 | 0.44 |
|  | AE-10 | 19.90 | 0.58 |
|  | AE-10 | 20.19 | 0.60 |
|  | AE-10 | 20.28 | 0.41 |
|  | AE-11 | 20.70 | 0.19 |

Comparing the data in Tables 1 and 2, it is interesting to note that while for the Tosoh material the sodium back ion exchange capacity increases with decreasing Si/Al ratio, the opposite is true for the Zeochem material. The data in Table 3 for the various UOP materials indicate that there is wide variation in sodium back ion exchange capacity in various materials even at essentially the same Si/Al ratio. These anomalies indicate that variation of the Si/Al ratio of the zeolite does not account for differences in sodium back ion exchange capacity and that even when the same nominal zeolite composition is manufactured by a single party wide differences in zeolite sodium back ion exchange capacity occur.

Support

The support of this invention is comprised of an inorganic oxide and zeolite. Suitable zeolite is one that is in the proton form and has a high Si/Al ratio of at least 12, and preferably of at least 18, and is further characterized in that, if a representative sample of the zeolite were to be subjected to sodium back ion exchange, the resultant zeolite sample would have a Na/Al mole ratio of at least 0.75, and preferably higher. High Si/Al zeolites that are candidates for use in the support include without limitation MFI, MEL, FER, Beta, UTD-1 and the like, with MFI/ZSM-5 zeolite being particularly preferred. Y-zeolite is not a high Si/Al zeolite as contemplated in this invention. Suitable inorganic oxides include, without limitation alumina, titania and zirconia, with alumina being preferred. Alumina may be any of its phases, with θ-alumina being preferred. The acceptable relative proportions of alumina to zeolite range from about 1:9 to about 4:1, with alumina to zeolite ratios between about 1:2 and about 3:2 being preferred.

After determination by sodium back ion exchange and analysis that the zeolite to be used in support manufacture is suitable, the catalyst may be manufactured.

Catalyst

The finished catalyst may be made by methods known to those skilled in the art. These methods include:

(a) adding a noble metal reagent to an inorganic oxide suspension, then adding the desired amount of zeolite to form a slurry, and then coating a monolith with the slurry; or (b) adding a noble metal reagent to a zeolite suspension, adding the desired amount of an inorganic oxide to form a slurry, and then coating a monolith with the slurry; or (c) adding noble metal reagent to each of an an inorganic oxide suspension and a zeolite slurry, mixing the two, and then coating a monolith with the slurry; or (d) making a slurry of an inorganic oxide and zeolite, then coating a monolith, and then impregnating the coating with noble metal.

Method (a) is preferred. Suitable noble metals include a catalytically effective amount of platinum, palladium, rhodium and gold and mixtures and alloys thereof, with platinum being preferred. The noble metal may be dispersed primarily on the an inorganic oxide, primarily on the surface of the zeolite or on both the an inorganic oxide and zeolite. For treatment of exhaust gases from "lean-burn" engines, platinum in concentrations of between about 0.015 wt. % of the support and about 10 wt. % of the support have been found to be effective, with concentrations between about 0.16 wt. % of the support and about 1.4 wt. % of the support being particularly preferred.

The thickness of the finished catalyst coating on a monolithic support such as cordierite should be between about 5 $\mu$m and about 200 $\mu$m thick.

Catalyst Performance

Catalyst made from support of this invention has been shown to exhibit superior performance both fresh and after aging in both laboratory and vehicle performance testing. Preparation of the catalysts used in comparative testing and of the tests and results are described in the following examples.

EXAMPLE 1

This example describes the method of support preparation of a catalyst of this invention.

An aqueous suspension consisting of 1755 grams of Condea SCFA-90 alumina, consisting predominately of $\theta$-alumina, in deionized water was prepared. To this suspension, 502.3 grams of Pt sulfite solution containing 50.78 grams of platinum, as the metal, was added and the mixture stirred for 2 hours. Then a sufficient amount of a solution consisting of 25 wt. % tetramethylammonium hydroxide in water to raise the pH to 7.0 was added. The resulting suspension was then milled to yield a particle size distribution whose median was about 5.5 microns. An amount of a thick paste of ZSM-5 equal to about twice the amount of alumina in the suspension was added. The ZSM-5 used in this example had a sodium back exchange capacity such that the limiting Na/Al mole ratio was 0.75. The resulting suspension was briefly milled, mainly to break up clumps of the zeolite, resulting in a median particle size distribution in the slurry of between about 4 and 5 microns. This slurry was then used to coat a cordierite monolith 14.38 cm in diameter by 15.24 cm long having a cell density of 62 cells/cm$^2$. The finished catalyst, comprising 1.5 g/m$^3$ of Pt on a support of 33 wt. % $\theta$-alumina and the balance ZSM-5 coated on a cordierite monolith, was designated Catalyst A.

EXAMPLE 2

Comparative

This example describes the method of support preparation of a catalyst having the same nominal composition as the catalyst of Example 1 but made from a zeolite with a low sodium back ion exchange capacity.

A comparative catalyst was made in the same manner as in Example 1 using ZSM-5 having a sodium back exchange capacity such that the limiting Na/Al mole ratio was 0.45. The finished catalyst was designated Catalyst B and had the same nominal composition as Catalyst A.

EXAMPLE 3

This example describes the laboratory testing of the catalyst samples prepared in Examples 1 and 2.

Catalytic converters were manufactured using the catalysts prepared in Examples 1 and 2 applied to equivalent size and type monoliths followed by drying and calcining. One converter at a time was connected to the exhaust pipe of a Peugeot IDI, turbocharged U60 engine. Catalyst inlet temperature was varied at constant speed (1540 rpm) by variation of the load placed on the engine, i.e., as load increased, inlet temperature increased. Diesel fuel was injected into the exhaust gas between the engine outlet and the converter inlet to adjust the hydrocarbon/NO$_x$ ratio to 10 at each load set point. NO$_x$ concentrations were determined using a chemiluminescent NO$_x$ analyzer. Because catalyst inlet temperature is varied by changing load, exhaust gas composition is slightly different at each test point. At the lowest temperature set point of 140° C. used in the tests, the exhaust gas composition at the inlet to the converter was 85 ppm NO$_x$, 259 ppm CO, 16.5% O$_2$, 3.4% CO$_2$, 860 ppm hydrocarbon, and the balance N$_2$. At the highest temperature set point of 365° C. used in the tests, the exhaust gas composition at the inlet to the converter was 162 ppm NO$_x$, 172 ppm CO, 8.6% O$_2$, 9.2% CO$_2$, 1,538 ppm hydrocarbon, and the balance N$_2$.

After testing the converters fresh, the catalyst in each converter was aged by placing them in the exhaust of a GM 6.2 liter IDI engine and running the engine for 50 hours on a dynomometer at a high enough speed and load to result in a catalyst inlet temperature of 650° C.

Figure 2:
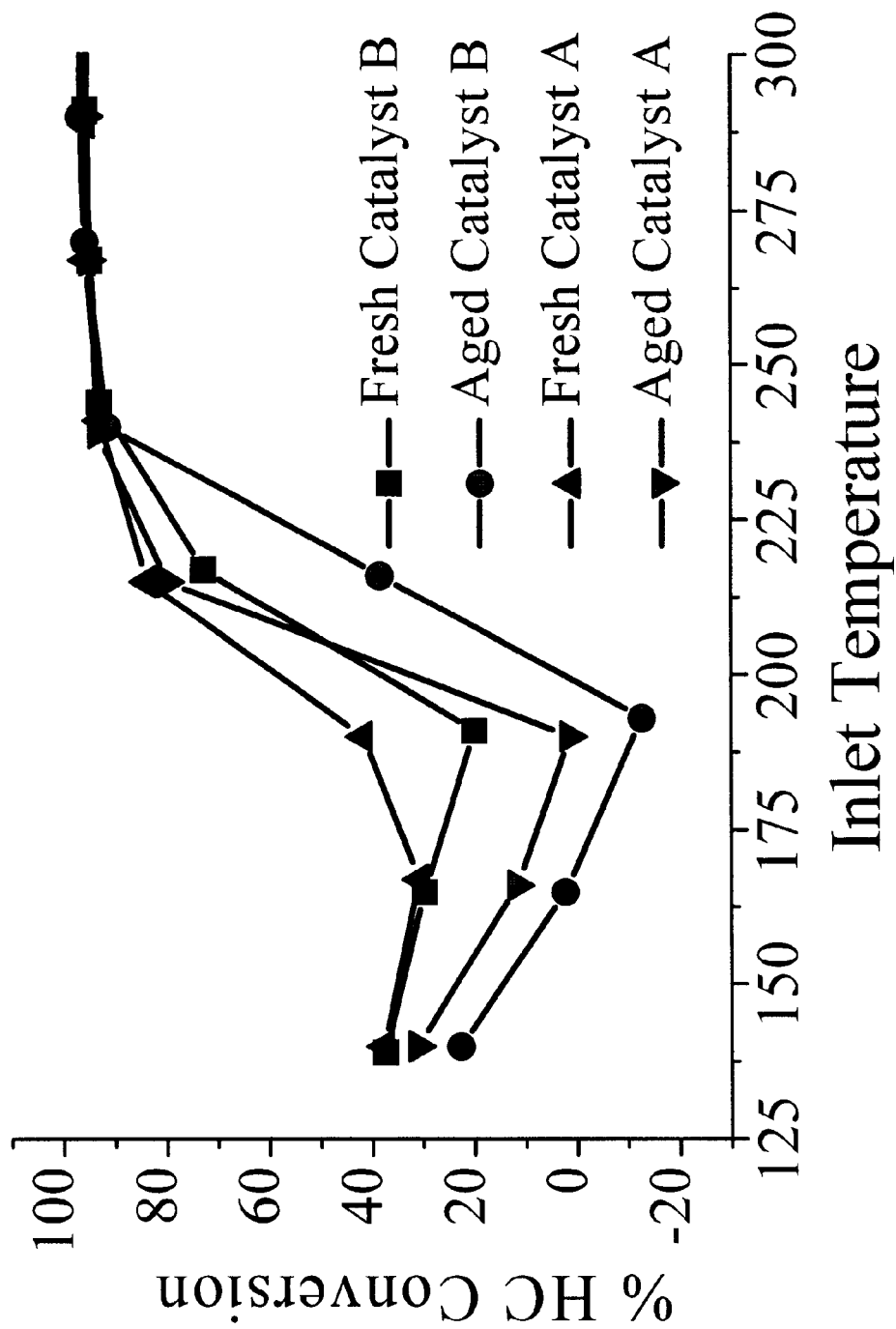
FIG. 2 shows hydrocarbon conversion versus inlet temperature of exhaust gas when treated by fresh and aged catalyst of this invention compared to that of fresh and aged catalyst of the same nominal composition made from zeolite with low sodium back ion exchange capacity.
Figure 3:
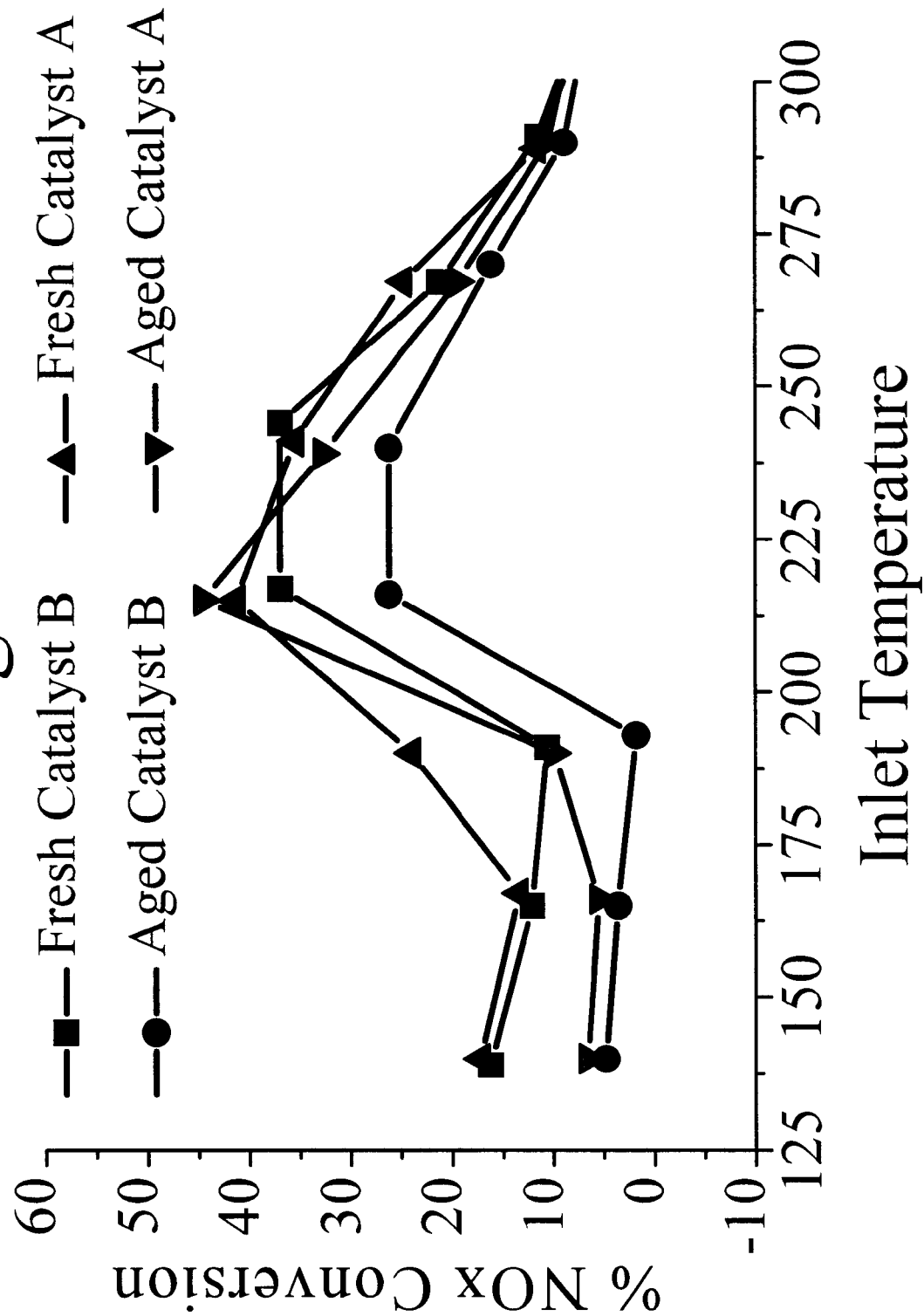
FIG. 3 shows $NO_x$ conversion versus inlet temperature of exhaust gas when treated by fresh and aged catalyst of this invention compared to that of fresh and aged catalyst of the same nominal composition made from zeolite with low sodium back ion exchange capacity.

The results of the tests are shown in FIGS. 1, 2 and 3. On all three figures, the performance of fresh Catalyst A is denoted ▲, that of aged Catalyst A is denoted ▼, that of fresh Catalyst B ■, and aged Catalyst B ●.

FIG. 1 shows CO conversion as a function of catalyst inlet temperature for both catalysts before and after aging. The test results demonstrate that Catalyst A, whether fresh or aged, has a lower lightoff temperature than even fresh Catalyst B.

FIG. 2 shows hydrocarbon conversion as a function of catalyst inlet temperature for both catalysts before and after aging. The test results demonstrate that Catalyst A, when fresh, has a lower lightoff than Catalyst B and that, even after aging, Catalyst A is as good as fresh Catalyst B.

FIG. 3 shows NO$_x$ conversion as a function of catalyst inlet temperature for both catalysts before and after aging. The test results demonstrate that Catalyst A, whether fresh or aged, has a lower lightoff temperature than even fresh Catalyst B.

EXAMPLE 4

This example describes the "on-vehicle" testing of the aged catalytic converters from Example 3.

The aged catalytic converters from Example 3 were installed on a Peugeot model 406 automobile. The performance of the converters was then evaluated by subjecting the cars to the European driving cycle, a series of low-speed accelerations, cruises, and decelerations to model urban driving conditions and, at the end of the test, a high-speed acceleration, brief cruise, and deceleration to model extra-urban or highway driving conditions. This driving cycle is also known as the ECE+EUDC driving cycle and the MVEG-A driving cycle.

The results of the evaluations are shown in Table 4.

TABLE 4

|  | HC, g/km | CO, g/km | NO$_x$, g/km | PM, g/km |
|---|---|---|---|---|
| Catalyst A | 0.06 | 0.52 | 0.31 | 0.046 |
| Catalyst B | 0.08 | 0.63 | 0.30 | 0.049 |

The results show that Catalyst A reduces hydrocarbon and CO emissions more than Catalyst B when subjected to vehicle testing and permits emission of about the same amounts of $NO_x$ and particulate matter.

I claim:

1. A method of reducing the amounts of CO, hydrocarbons and $NO_x$ in exhaust gas emissions from a lean-burn internal combustion engine comprising contacting the exhaust gas with a four-way exhaust conversion catalyst consisting of a catalytically effective amount of noble metal on a support comprising an inorganic oxide and zeolite, wherein the zeolite has a Si/Al ratio of at least 12, is in the proton form, and is further characterized in that, if said zeolite were to be treated with a non-basic solution of sodium salt until maximum substitution with sodium is achieved, the zeolite would have a Na/Al mole ratio of at least 0.75.

2. The method of claim 1, wherein the zeolite is determined to have a Na/Al mole ratio of at least 0.75 by a process comprising:
   a) suspending a sample of each zeolite having a Si/Al ratio of at least 12 and in the proton form in 1 molar non-basic solution of a sodium salt, stirring for at least 10 hours, and then filtering and washing, thereby removing any soluble salts adhering to the zeolite;
   b) analyzing the product of step (a) to determine the amounts of Na and Al contained therein and calculating the mole ratio of Na/Al;
   c) starting with the product of step (a), repeating steps (a) and (b) as many times as necessary until the mole ratios of Na/Al are within 5% for two successive repetitions; and
   d) selecting those zeolites, the samples of which demonstrate a Na/Al mole ratio of at least 0.75 in step (c).

3. The method of claim 2 wherein the analyzing of step (b) is by Inductive Coupled Plasma spectroscopy.

4. The method of claim 1, wherein the inorganic oxide is selected from alumina, titania, zirconia and mixtures thereof.

5. The method of claim 4, wherein the inorganic oxide is alumina and comprises between about 10 wt. % and about 80 wt. % of the support.

6. The method of claim 5, wherein the inorganic oxide is an alumina selected from α-alumina, γ-alumina, δ-alumina, η-alumina, κ-alumina, χ-alumina and θ-alumina and mixtures thereof.

7. The method of claim 1, wherein the zeolite is selected from MFI, MEL, FER, Beta, and UTD-1.

8. The method of claim 1, wherein the noble metal is selected from Pt, Pd, Rh, Au and mixtures and alloys thereof.

9. The method of claim 8, wherein at least some of the noble metal is dispersed on the inorganic oxide.

10. The method of claim 1, wherein the noble metal is Pt and comprises between about 0.0283 g $Pt/m^3$ of support and about 5.66 g $Pt/m^3$ of support.

* * * * *